(12) United States Patent
Anderson et al.

(10) Patent No.: US 9,534,623 B2
(45) Date of Patent: Jan. 3, 2017

(54) FURNITURE JOINT

(75) Inventors: Benny Anderson, Älmhult (SE);
Anders Eriksson, Älmhult (SE);
Göran Sjöstedt, Älmhult (SE)

(73) Assignee: INTER IKEA SYSTEMS B.V. (NL)

( * ) Notice: Subject to any disclaimer, the term of this patent is extended or adjusted under 35 U.S.C. 154(b) by 73 days.

(21) Appl. No.: 14/371,877

(22) PCT Filed: Jan. 13, 2012

(86) PCT No.: PCT/EP2012/050469
§ 371 (c)(1),
(2), (4) Date: Oct. 27, 2014

(87) PCT Pub. No.: WO2013/104422
PCT Pub. Date: Jul. 18, 2013

(65) Prior Publication Data
US 2015/0050081 A1 Feb. 19, 2015

(51) Int. Cl.
*F16B 12/12* (2006.01)
*F16B 12/22* (2006.01)
(Continued)

(52) U.S. Cl.
CPC ............ *F16B 12/125* (2013.01); *F16B 12/22* (2013.01); *F16B 12/46* (2013.01); *A47B 47/042* (2013.01);
(Continued)

(58) Field of Classification Search
CPC ........... F16B 12/02; F16B 12/04; F16B 12/10; F16B 12/12; F16B 12/14; F16B 12/125; F16B 12/44; F16B 12/46; Y10T 403/7045; Y10T 403/7035; Y10T 403/7094; Y10T 403/7007
See application file for complete search history.

(56) References Cited

U.S. PATENT DOCUMENTS 4,258,464 A 3/1981 Ullman, Jr.
5,688,030 A * 11/1997 McAnally ............. F16M 11/20
248/500

FOREIGN PATENT DOCUMENTS

CN 201050526 Y 4/2008
CN 201297587 Y 8/2009
(Continued)

OTHER PUBLICATIONS

Machine Translation of DE102007058662, http://worldwide.espacenet.com, Dec. 2, 2015.*

*Primary Examiner* — Daniel Wiley
(74) *Attorney, Agent, or Firm* — Condo Roccia Koptiw LLP

(57) ABSTRACT

A joint for assembling two furniture parts to each other. A first furniture part has a male part for co-operation with a female part of a second furniture part. Each of the male and female parts has a number of grooves. At assembly the male part is moved along the female part via co-operation between the grooves of the male and female part, respectively. The co-operating male and female parts have an insertion position and an end position, in which end position the furniture parts are assembled to each other. The grooves of one of the female and male parts are compressed during movement from the insertion position to the end position. The grooves of the pair of co-operating female part and male part are such that the furniture parts are pressed toward each other when the male part is moved along the female part.

16 Claims, 5 Drawing Sheets

(51) Int. Cl.
  *F16B 12/46* (2006.01)
  *A47B 96/06* (2006.01)
  *A47B 47/04* (2006.01)

(52) U.S. Cl.
  CPC ........ *A47B 96/066* (2013.01); *F16B 2012/463* (2013.01); *F16B 2012/466* (2013.01); *Y10T 403/7015* (2015.01); *Y10T 403/7045* (2015.01)

(56) References Cited

FOREIGN PATENT DOCUMENTS

| | | |
|---|---|---|
| DE | 2340307 A1 | 2/1975 |
| DE | 298 10 385 U1 | 12/1998 |
| DE | 298 01 231 U1 | 6/1999 |
| DE | 1 178 225 A1 | 2/2002 |
| DE | 10 2005 053321 A1 | 5/2007 |
| DE | 10 2007 058662 A1 | 6/2009 |
| DE | 10 2010 014662 A1 | 10/2011 |
| EP | 1 178 225 A1 | 2/2002 |
| FR | 2446946 A1 | 8/1980 |
| WO | WO 2004/111471 A1 | 12/2004 |
| WO | WO 2010/034467 A1 | 4/2010 |

\* cited by examiner

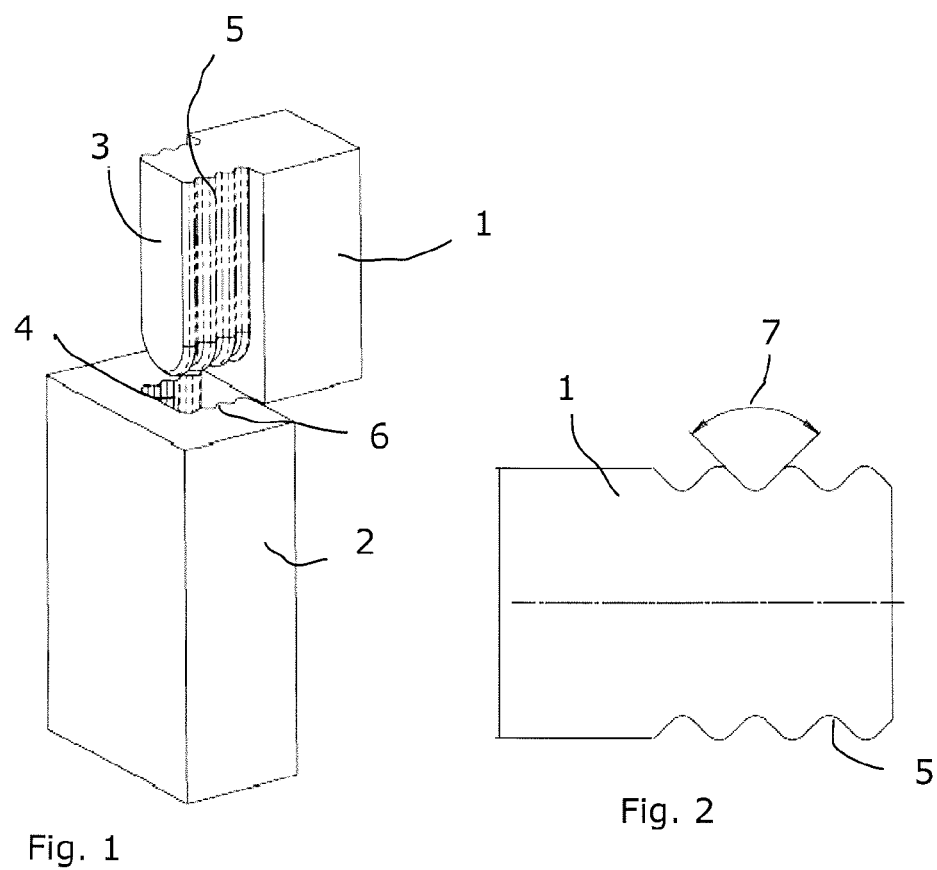
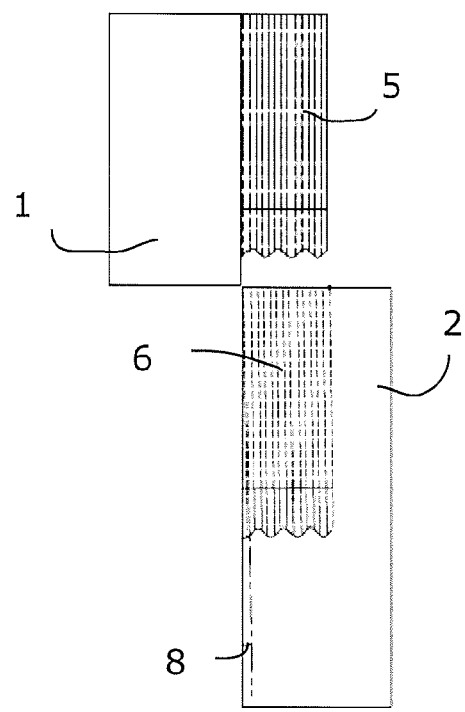
Fig. 1
Fig. 2
Fig. 3

FURNITURE JOINT

This application is the National Stage entry under 35 U.S.C. §371 of PCT Application No. PCT/EP2012/050469 filed Jan. 13, 2012, the contents of which are hereby incorporated by reference in their entirety.

TECHNICAL FIELD

The present invention concerns a joint between two furniture parts.

PRIOR ART

To join furniture parts to each other many different ways have been used throughout the years. Often different types of mechanical fastening means are used. It is also known to give the furniture parts different shapes, such as grooves, for forming joints between the furniture parts.

For self-assembly furniture it is important that the different furniture can be assembled to each other in a safe and relatively simple way. This is especially important when the customer is to assemble the furniture. It is therefore always an aspiration to improve the joints between the different furniture parts. Such improvements of joints have many components. The improvements may concern the quality of the joint, i.e. how well the furniture parts are assembled to each other, may concern the manufacturing cost, may concern ease of assembly etc.

SUMMARY

One object of the present invention is to be able to arrange joints for assembly of furniture parts to each other. The joints should be practical to use and yet give a secure assembly of the furniture parts. A further object is that the furniture parts may be assembled without the need of any fastening means and without the use of any tools. It should also be possible to open to separate the furniture parts from each other after assembly, without harming the furniture parts.

According to one aspect of the present invention a joint for assembly of a first furniture part and a second furniture part to each other is arranged. The first furniture part has one or more male parts co-operating with one or more female parts of the second furniture part. Each of the male and female parts has a number of grooves. At assembly the male parts are moved along the female parts by means of co-operation between the grooves of the male and female parts. The co-operating male and female parts have an insertion position and an end position, in which end position the furniture parts are assembled to each other. The grooves of one of the female and male parts incline in relation to the grooves of the other part, whereby the furniture parts are pressed toward each other when the male part is moved along the female part.

As used in this description "furniture part" means any type of furniture part, such as a leg, shelf, side, top but also any type of appliance, such as a hinge or a door knob.

Further objects and advantages of the present invention will be obvious to a person skilled in the art reading the detailed description below of different embodiments.

BRIEF DESCRIPTION OF THE DRAWINGS

The invention will be described further below by way of examples and with reference to the enclosed drawings. In the drawings, FIG. 1 is a part view of one example of a joint according to the present invention, FIG. 2 is a view from above of one example of a male part of a joint according to the present invention, FIG. 3 is a side view, partially cut out, illustrating one aspect of the present invention.

DETAILED DESCRIPTION OF EMBODIMENTS

Figure 4:
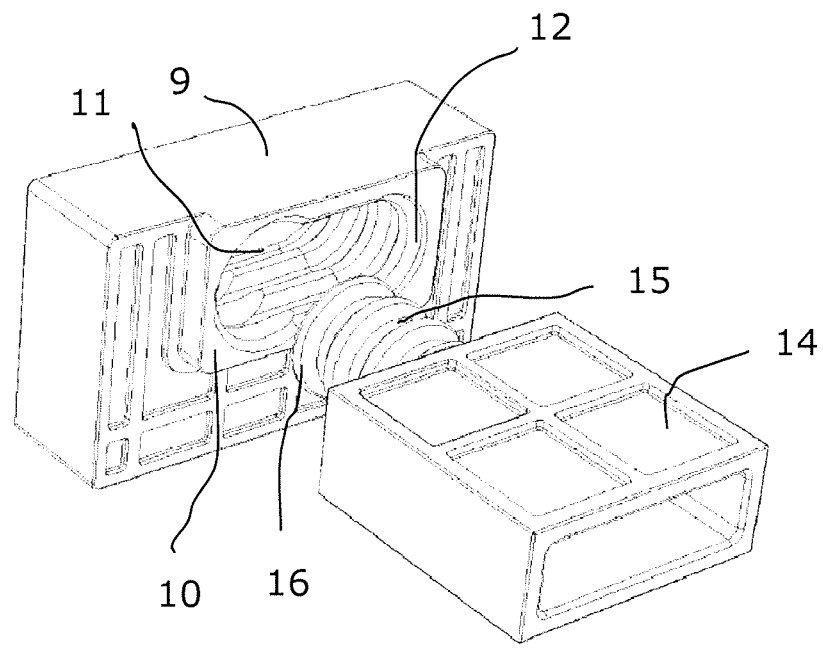
FIG. 4 is a perspective view of a further example of co-operating female and male parts according to the present invention.

According one embodiment of the present invention shown in FIGS. 1-3 a joint is formed between two furniture parts, in that a male part 3 of a first furniture part 1 co-operates with a female part 4 of a second furniture part 2. The male part 3 has a number of grooves 5 co-operating with corresponding grooves 6 of the female part 4. The male part 3 is to be inserted at one end of the female part 4 and is then to be slid to an opposite end of the female part 4.

The grooves 6 of the female part 4 inclines slightly in longitudinal direction, whereby the first furniture part 1 having the male part 3 is drawn or pulled against the second furniture part 2 during the sliding movement for the male part 3 inside the female part 4. The grooves 6 of the female part 4 inclines somewhat in relation to a general plane for the furniture part 2. Said inclination of the grooves 6 of the female part 4 is indicated by the angle 8 as shown in FIG. 3. The angle 8 is shown as taken between the side of the female part 2 and an imaginary extension of one of the grooves 6 of the female part 2. The inclination angle 8 is in the order of up to 5°. Preferably, the inclination angle 8 is between 0.5° and 5° and most preferred the inclination angle 8 is about 2°. If the inclination angle 8 is too small the furniture parts 1, 2 may not be pulled together in a proper way, leaving a gap between the furniture parts 1, 2. If the inclination angle 8 is too big, it may be difficult to slide the male part 1 along the female part 2. The inclination angle 8 is partly dependent on the length of the grooves 6 of the female part 2, thus, the length the male part 1 will slide. The longer said length is, the smaller the inclination angle 8 may be.

In this description the female parts are generally shown having inclined grooves, while the male parts have straight grooves. However, it is also possible to let the male parts have inclined grooves and let the female parts have straight grooves. A further possibility is to have inclined grooves alternating between the female parts and the male parts, but in each joint one of the male and female parts will have inclined grooves while the other part has straight grooves.

In the assembly of the two furniture parts 1, 2 to each other the grooves 6 of the female part 4 will be slightly compressed, due to the inclination of the grooves 6 of the female part 4. In order for the compression to work the material of the grooves 6 of the female part 4 should be softer than the material of the grooves 5 of the male part 3. By means of the compression of the female part 4 the furniture parts 1, 2 are locked to each other. The female part 4 and the male part 3 are given a position and the grooves 6 of the female part 4 incline in such a way that the furniture parts 1, 2 are abutting each other and that they are placed in desired positions in relation to each other after assembly.

The grooves 5 of the male part 3 do not incline in longitudinal direction. As seen in cross section the sides of each groove 5 of the male part 3 forms an angle 7 of about 90°. By letting the grooves 5 form an angle of about 90°, the pressure of the joint will be distributed in a suitable way. The grooves 6 of the female part may also have an angle of about 90°.

In the embodiment of FIG. 1 the male part 3 is made in one piece with the first furniture part 1 and the female part 4 is made in one piece with the second furniture part 2. If the first and second furniture parts 1, 2 are made of wood the male part 3 and the female part 4 are made by milling and/or turning. In other embodiments the male part is a separate part, which is to be fixed to a furniture part.

In the embodiment of FIG. 1 the female part 4 is open towards an end of the second furniture part 2. The open end of the female part 3 forms an insertion opening. The male part 3 of the first furniture part 1 has an oblong extension and the grooves 5 extend along three sides of the male part. There are no grooves on an end side of the male part 3, which end side of the male part 3 is to be flush with an end side of the first furniture part 1 after assembly. To facilitate insertion of the male part 3 into the female part 4, the side of the male part 3 opposite the side having no grooves is rounded. In assembly of the first and second furniture parts 1, 2 to each other the male part 3 is slid along the female part 4 until the male part 3 reaches an end position, where it abuts the bottom of the female part 4. In said assembled condition the grooves 5 of the male part 3 and the grooves 6 of the female part 4 are in contact along the total extension of the grooves 5, 6 of the male part 3 and the female part 4, respectively.

Figure 5:
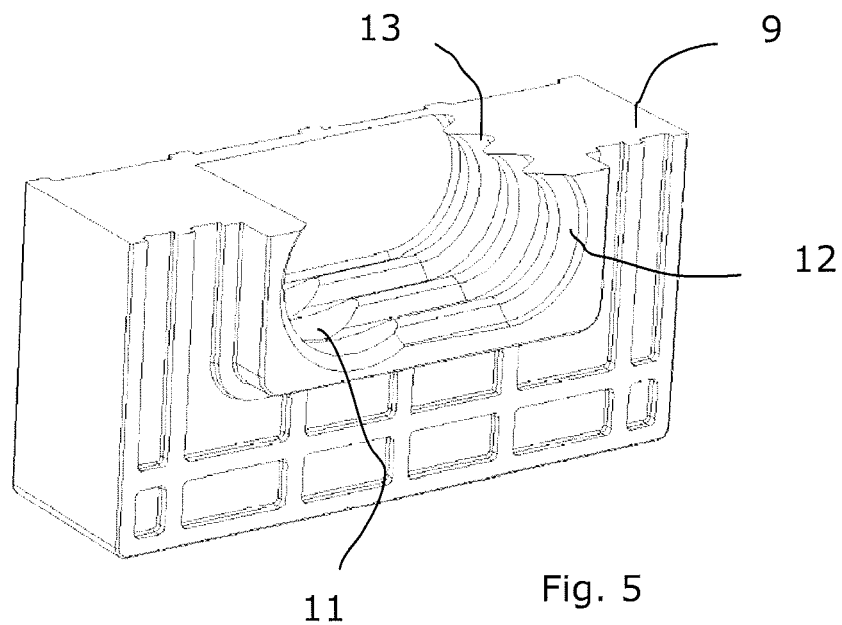
FIG. 5 is a cut view of the female part of FIG. 4.
Figure 6:
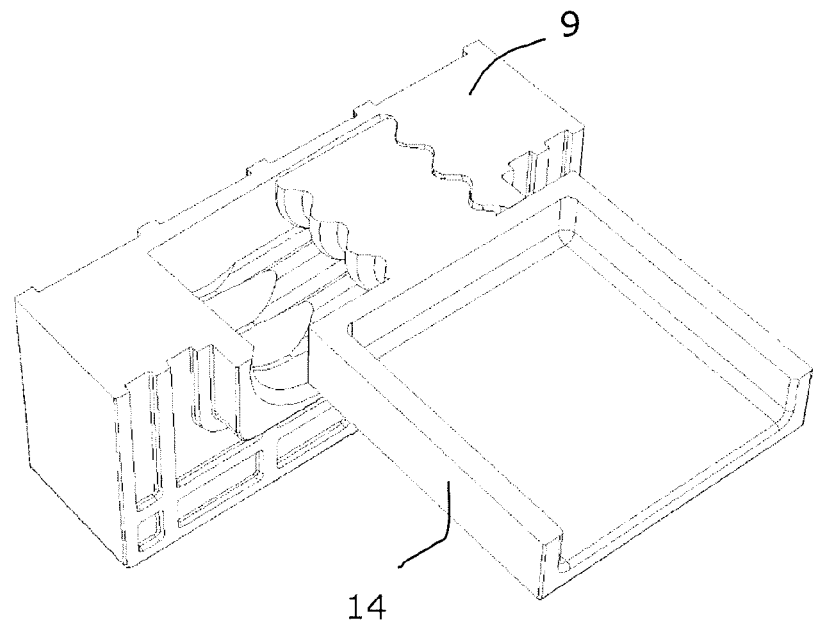
FIG. 6 is a cut view of a joint formed by the male part and female part of FIGS. 4 and 5.

In the example of FIGS. 4 to 6 a first joint part 9 having a female part 10 is to co-operate with a second joint part 14 having a male part 16. The grooves 13 of the female part 10 are arranged to go from an insertion opening 11 to an inner end 12. In the insertion opening 11 of the female part 10 there are no grooves in order for being able to receive the male part 16. In assembling the first and second joint parts 9, 14 to each other the male part 16 is inserted in the insertion opening 11 of the female part 10. The male part 16 is pushed into the insertion opening until it abuts the bottom of the female part 10. The male part 16 is then slid along the female part 10, by co-operation between the grooves 13, 15 of the female part 10 and male part 16, respectively, until the male part 16 is at the inner end 12 of the grooves 13 of the female part 10. In the same way as stated above, the grooves 13 of the female part 10 inclines. The inclination is such that the second joint part 14, having the male part 16, is pulled towards the first joint part 9, having the female part 10. The inner dimension of the insertion opening 11 of the female part is somewhat larger than the outer dimension of the male part 16, in order to facilitate insertion of the male part 16 into the female part 10. During the sliding movement of the male part 16 along the female part 10 the grooves 13, 15 are compressed.

In the embodiment of FIGS. 4 to 6 the male part 16 and the female part 10 are made as parts of the first and second joint part 9, 14, respectively. The joint parts 9, 14 are to be received in openings or sides of furniture parts to be joined to each other. The joint parts 9, 14 may be fixed to the openings or sides of the furniture parts in different ways, such as by glue or ultra sound welding. As described above the female part 10 has an insertion opening 11 from which opening a number of grooves extends to an inner end 12. In the shown embodiment the male part 18 has the form of a pin.

A person skilled in the art realizes that the male and female parts of the joint parts in other embodiments have corresponding shapes to those shown in FIG. 1. Thus, the male part may be oblong as seen in end view and with a rounded end. In corresponding way the female part of the joint part may have an open end to receive a male part having an oblong form.

Figure 7:
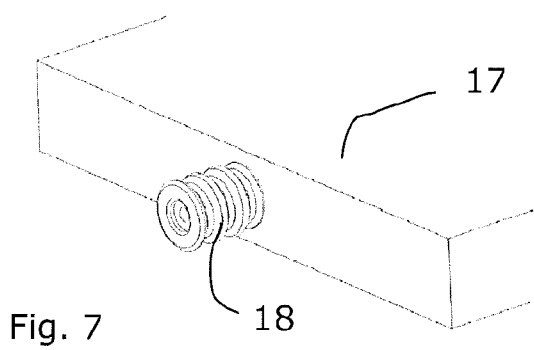
FIG. 7 is a perspective view of a furniture part having a male part.

In FIG. 7 one example of a shelf 17 having an integrated male part 18 is shown. The male part 18 may be attached in different ways to the shelf 17, such as by glue, welding, inserted in an opening.

Figure 8:
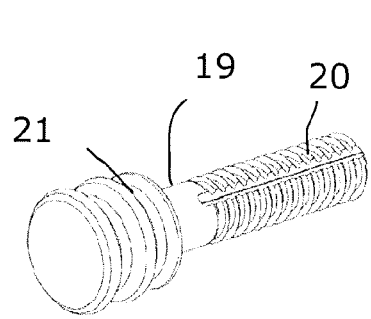
FIG. 8 is a perspective view of one example of a male part according to the present invention, which male part is to be attached to a furniture part.

In FIG. 8 a male part 19 is shown. One end of the male part 19 has the form of a peg 20, which peg 20 is to be received in an opening of a furniture part. The peg 20 as shown has been developed for fixation in the opening of the furniture part by means of glue. In the end of the male part 19 opposite the peg 20, a number of grooves 21 are arranged for co-operation with grooves of a female part.

Figure 9:
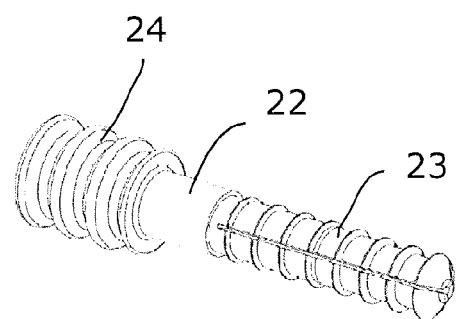
FIG. 9 is a perspective view of a further example of a male part according to the present invention, which male part is to be attached to a furniture part.

In FIG. 9 a further example of a male part 22 is shown. The male part 22 has a peg 23 at one end, which peg is to be fixed to an opening of a furniture part in that the peg 23 is to expand. At the end opposite the peg 23, the male part 22 has a number of grooves 24 for co-operation with grooves of a female part. The expansion of the peg 23 may accomplished by insertion of a pin in an opening in the centre of the male part 22.

Figure 10:
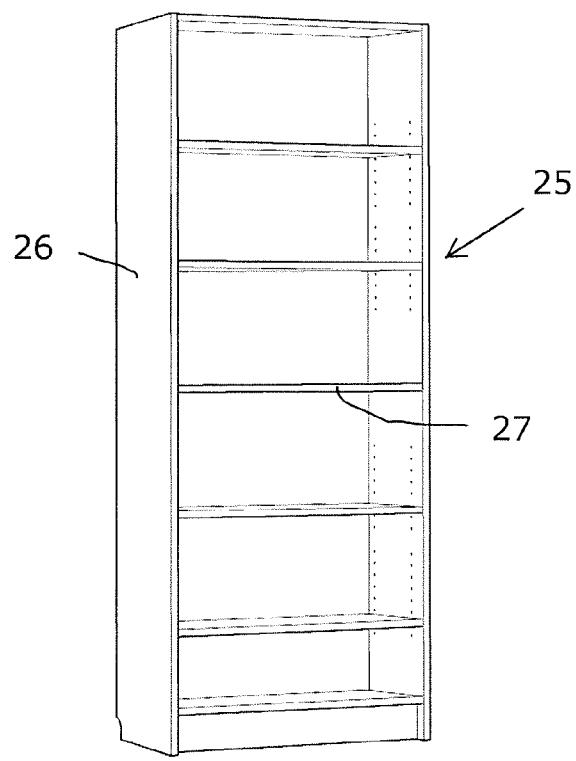
FIG. 10 is a perspective view of a bookcase wherein the joints of the present invention may be used to attach different parts of the bookcase to each other.
Figure 11:
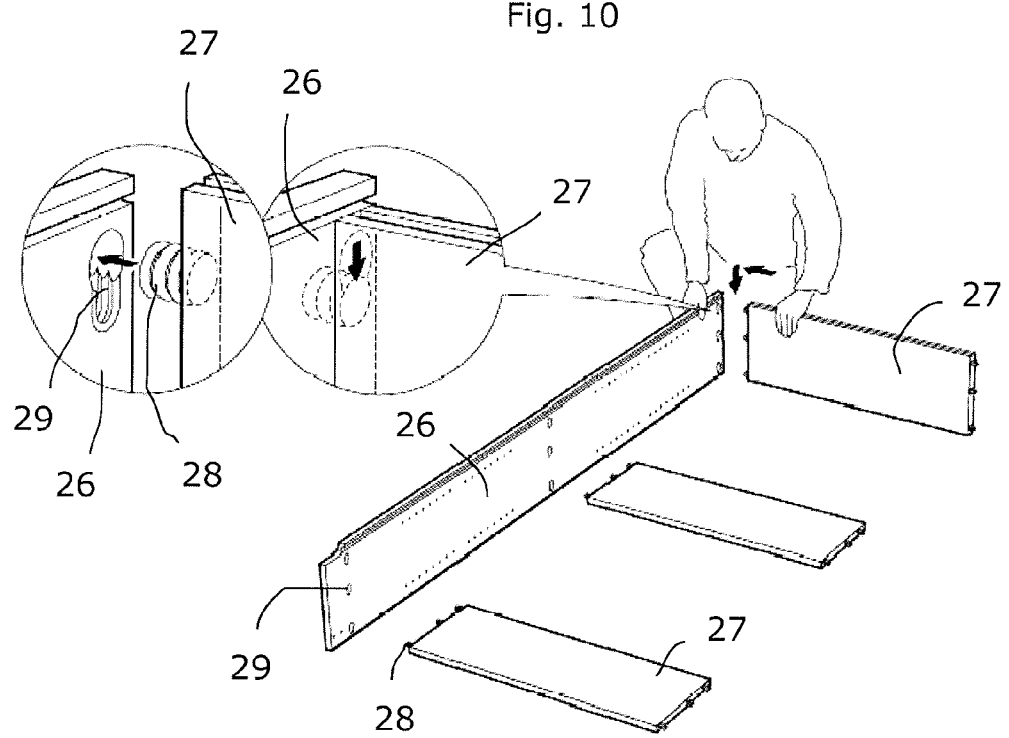
FIG. 11 is a perspective view illustrating assembly of the bookcase of FIG. 9.

In the embodiment of FIGS. 10 and 11 each male parts 28 has the form of a pin projecting from one side of a first furniture part, which first furniture part in this case is a shelf 27 of a bookcase 25. The male parts 28 of the shelves 27 are to co-operate with female parts 29 of sides 26 of the book case 25. In the shown embodiments three male parts 28 are arranged at opposite ends of a shelf 27 for co-operation with three female parts 29 on respective side 26 of the bookcase 25. The male parts 28 have a number of groves, in the same way as described above. The male parts are made in one piece with the furniture part or are made as separate parts. If the pins are separate parts they are attached to the furniture part in any suitable way. The possible fixation of the pins to the furniture part may be accomplished by means of different fastening means, glue, soldering or welding.

In FIG. 11 a way of assembling two furniture parts to each other is indicated. In a first step the three male parts 28 on one end surface of a shelf 27 are each placed in the insertion opening of a female part 29 of one side 26. The male parts 28 of the shelf 27 are then slid along the female parts 29 of the side 26 until the male parts 28 reach the inner ends of the grooves of the female parts 29.

Figure 12:
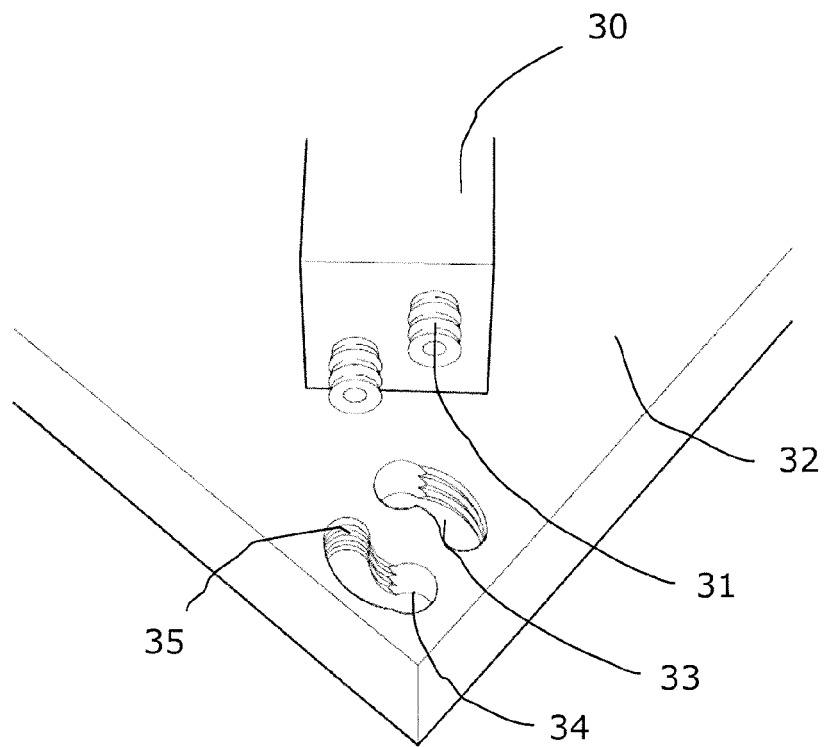
FIG. 12 is a perspective detail view of a table leg and a table top to be joined to each other using a joint according to the present invention.
Figure 13:
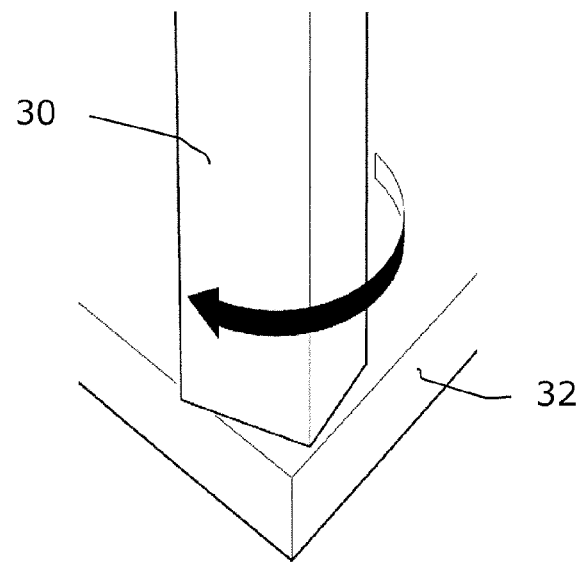
FIG. 13 is a perspective view of the table leg and table top of FIG. 12, indicating the way the leg is to be attached to the table top.

In FIGS. 12 and 13 a further example of a joint according to the present invention is indicated. In the shown example a table leg 30 is to be assembled to a table top 32. The table leg 30 has two male parts 31 at an end of the table leg to be attached to the table top 32. Two female parts 33 are arranged at a short distance from each other on a lower side of the table top 32. The female parts 33 are arranged in the area of a corner of the table top 32. Said female parts 33 have a curved form and in a corresponding way as described above the female parts 33 have an insertion opening 34 and an inner end 35. Furthermore, the female parts 33 have grooves that incline in longitudinal direction from the insertion opening 34 towards the inner end 35 of respective female part. The female parts 33 of the table top 32 are to receive the two male parts 31, in the form of pins, of the table leg 30. The table leg 30 is to be assembled to the table top 32 in that the male parts 31 are inserted into the insertion openings 34 of the female parts 33, where after the table leg 30 is turned in such a way that the male parts 31 while slide inside the female parts 33 until the male parts 31 reach the inner ends 35 of the grooves of the female parts 33 of the table top 32. The movement of the table leg 30 during assembly is indicated by the arrow in FIG. 13. In the same way as described above, the grooves of the female parts 33 will be compressed by means of the inclining grooves giving a locking function between the table leg 30 and table top 32 in assembled condition. In one embodiment (not shown) a pin placed in the middle of the side of the table leg having the two male parts is to be received in an opening placed between the female parts of the table top. The function of the pin of the table leg and the opening of the table top is to correctly position the table leg in relation to the table top.

In a further alternative embodiment both the male part and the female part has a general circular cross section. Hereby the male part is inserted in an insertion position in relation to the female part. The male part is then rotated in the female part until it reaches an end position. The male and female parts have a number of grooves and in the same way as described above the grooves of one of the male and female parts incline in relation to the grooves of the other part. The inclination of the grooves is such that the furniture parts having the male and female parts will be drawn against each other. As stated above the furniture parts may include parts or appliances of different types of furniture.

In one embodiment the female part has a slightly triangular shape in plan view, whereby the female part tapers from an insertion opening towards an inner end. At the inner end the width of the grooves of the female part is slightly smaller than the width of the grooves of the male part, giving a distinct end position. The triangular shape of the female part may be given by letting a milling head follow a slightly different track from the insertion opening to the inner end than from the inner end to the insertion opening. Having a distinct end position may give a user confirmation that the furniture parts are assembled to each other in a proper way.

The number of grooves of the male and female part may vary but normally at least two grooves are arranged at respective part. The number of co-operating grooves of the male and female parts influences the strength of the joint. The more grooves the stronger the joint will be.

The male part has a flange at an outer free end in some embodiments. The female part is formed to receive the flange of the mail part to guarantee that the male part cannot be moved along the female part until the male part is at the bottom of the female part.

The furniture parts may be parts of different types of furniture, such as tables, chairs, cupboards, shelves and may include different appliances, such as hinges and door knobs. The furniture parts as well as the male and female parts may be made of many different materials, such as wood, fibre or chip boards, plastic and metal. Co-operating female and male parts may be made of different materials, but the material of one of the parts should be soft and normally softer than the material of the other part.

The male and female parts of the present invention may be used with furniture parts of different thickness. It has shown that the joints function well for furniture parts having a thickness of at least 10 mm. However, it is likely that the joints would also function with furniture parts thinner than 10 mm.

The number of co-operating male and female parts varies depending for instance on the furniture parts to be assembled.

The invention claimed is:

1. A furniture joint comprising:
    a female part included in a first furniture part, the female part configured to accept a male part included in a second furniture part at an insertion position of the female part, wherein an opening of the female part is triangularly tapered from the insertion position to an end position, and the female part comprises first grooves configured to interact with second grooves included on the male part; and
    the male part included in the second furniture part, wherein the male part comprises the second grooves that are configured to interact with the first grooves of the female part as the male part is moved in a first direction from the insertion position of the female part to the end position of the female part along the triangularly tapered opening,
    wherein the interaction of the first and second grooves results in the first and second furniture parts being pressed towards each other in a second direction, substantially perpendicular to the first direction, as the male part is moved from the insertion position to the end position of the female part along the triangularly tapered opening.

2. The furniture joint as in claim 1, wherein the triangularly tapered opening of the female part for accepting the male part is wider at the insertion position than at the end position.

3. The furniture joint as in claim 1, wherein the first grooves of the female part and the second grooves of the male part incline with respect to each other.

4. The furniture joint as in claim 3, wherein at least one of the female part or the male part is comprised of plastic.

5. The furniture joint as in claim 1, further comprising at least a second female part included in the first furniture part, and at least a second male part included in the second furniture part.

6. The furniture joint as in claim 5, wherein third grooves of the second female part and fourth grooves of the second male part are configured to interact substantially simultaneously as the interaction of the first grooves of the female part and second grooves of the male part when assembling the first and second furniture parts.

7. The furniture joint as in claim 1, wherein the male part comprises a peg, and a first end of the peg is configured for insertion into the second furniture part and a second end of the peg is configured to interaction with the female part and includes the second grooves.

8. The furniture joint as in claim 1, wherein each of the first and second grooves are compressed during the interaction of the first and second grooves as the male part is moved from the insertion position to the end position of the male part.

9. A method of assembling furniture parts, the method comprising:

inserting a male part included in a second furniture part into an opening of a female part included in a first furniture part at an insertion position of the female part, wherein the opening of the female part at the insertion position is wider than the opening of the female part at an end position, and the opening is triangularly tapered from the insertion position to the end position;

moving the male part along the opening of the female part from the insertion position to the end position along the triangularly tapered opening, the female part comprising first grooves along at least adjacent walls of the opening and the male part comprising second grooves along at least a protrusion that enters the opening of the female part, wherein moving the male part along the opening of the female part in a first direction from the insertion position to the end position along the triangularly tapered opening causes an interaction of the first and second grooves, and the interaction of the first and second grooves results in the first furniture part and the second furniture part being pressed together in a second direction, substantially perpendicular to the first direction; and reaching the end position of the female part with the male part, wherein upon reaching the end position of the female part an indication of completed assembly is provided due to the interaction of the male and female parts at the end position.

10. The method as in claim 9, wherein the indication of completed assembly is effected due to the first grooves of the female part having a smaller width at the end position than the second grooves of the male part.

11. A furniture joint comprising:

a male part of a second furniture part;

a female part of a first furniture part, the female part configured to accept the male part at an insertion position, the female part comprising first grooves configured to interact with second grooves included on the male part, wherein the first and second grooves are configured such that movement of the male part in a first direction from the insertion position of the female part to an end position of the female part along a triangularly tapered opening of the female part results in the first and second furniture parts being pressed together in a second direction, substantially perpendicular to the first direction, due to the interaction of the first and second grooves and results in a distance between the first and second furniture parts is decreased.

12. The furniture joint as in claim 11, wherein the first and second furniture parts are configured to be substantially flush when the male part reaches the end position of the female part.

13. The furniture joint as in claim 11, wherein a width of the first grooves at the end position is smaller than a width of the second grooves and interaction of the first and second grooves at the end position indicates that the first and second furniture parts have been assembled.

14. The furniture joint as in claim 11, wherein at least one of the male part or the female part is comprised of wood.

15. The furniture joint as in claim 11, wherein the first and second grooves are configured such that the movement of the male part from the insertion position of the female part to the end position of the female part results in the first and second grooves being compressed, and the first and second grooves being compressed results in the first and second furniture parts being pressed together.

16. The furniture joint as in claim 11, wherein at least one of the male part or the female part is comprised of plastic.

* * * * *